March 1, 1955     A. MARCELLI     2,702,911
SHANK SKIVING MACHINE

Filed July 3, 1950     2 Sheets-Sheet 1

INVENTOR.
ATTILIO MARCELLI
BY
ATTORNEYS

March 1, 1955 — A. MARCELLI — 2,702,911
SHANK SKIVING MACHINE
Filed July 3, 1950 — 2 Sheets-Sheet 2

INVENTOR.
ATTILIO MARCELLI
BY Kalish & Gross
ATTORNEYS

2,702,911

SHANK SKIVING MACHINE

Attilio Marcelli, Plainview, Ill.

Application July 3, 1950, Serial No. 171,795

9 Claims. (Cl. 12—17)

This invention relates to certain new and useful improvements in shank skiving machines.

In applying new half soles to worn shoes, it is necessary after removing the old sole portion to provide a uniform bevel or so-called "scarf" upon the shank portion for a snug surface-wise engagement against a corresponding bevel formed on the new half sole. Through normal shoe construction, the shank portion of shoes have a transverse curvature which may become accentuated through wear. It is this arcuate character of the shoe shanks which has heretofore presented a substantial obstacle in the skiving of a uniform bevel thereon since currently used machines will tend to "dig in" upon the central portion of the shank and thereby cause the formation of an uneven bevel. Most often the operator attempts to correct this condition by use of a hand tool, in order to assure that the half sole will be mounted in a neat and secure fashion.

It is, therefore, the primary object of the present invention to provide a shank skiving machine which will cut a bevel of uniform degree throughout the shank of a shoe, regardless of the transverse curvature thereof.

It is a further object of the present invention to provide a shank skiving machine which is adapted to accommodate various thicknesses of leather and is provided with means for automatically adjusting the skiving cutter responsively thereto.

It is an additional object of the present invention to provide a shank skiving machine which is adapted to skive as well the leather from which the new half soles are formed and which is durable and reliable in usage, having a simplicity of parts and being light in weight for facile transportability.

It is a still further object of the present invention to provide a shank skiving machine which is provided with an annular work support surface which obviates the necessity of pre-setting prior to skiving action but permits the machine to be operated at whatever position the work support may be.

With the above and other objects in view, my invention resides in the novel features of form, construction, arrangement, and combination of parts presently described and pointed out in the claims.

In the accompanying drawings (two sheets):

Figures 1, 2, 3, 4, 5:
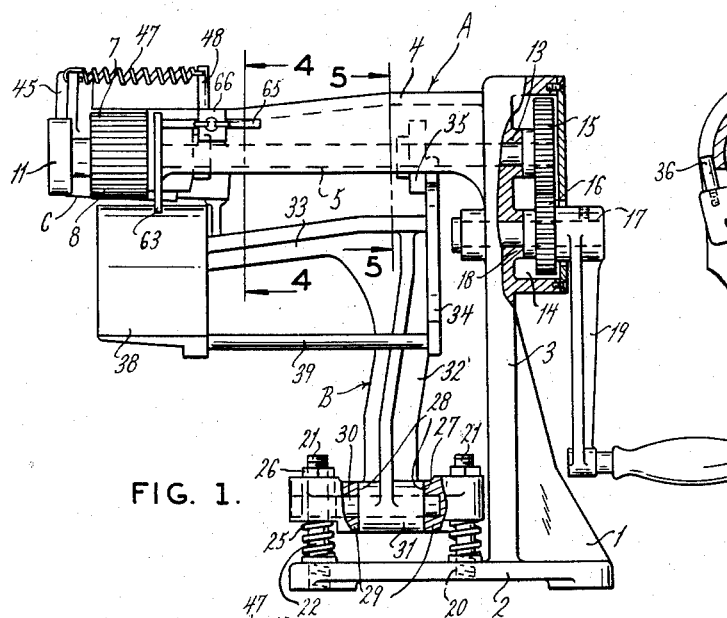
Figure 1 is a front view of a shank skiving machine constructed in accordance with and embodying the present invention.
Figure 2 is an end view.
Figure 3 is an enlarged fragmentary top view of the knife carrier and adjacent structure.
Figure 6:
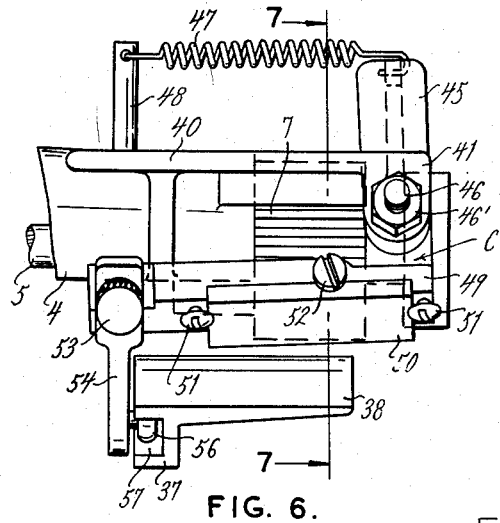
Figure 8:
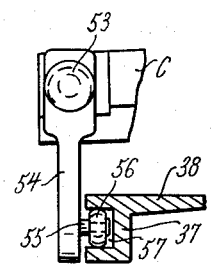
Figure 11:
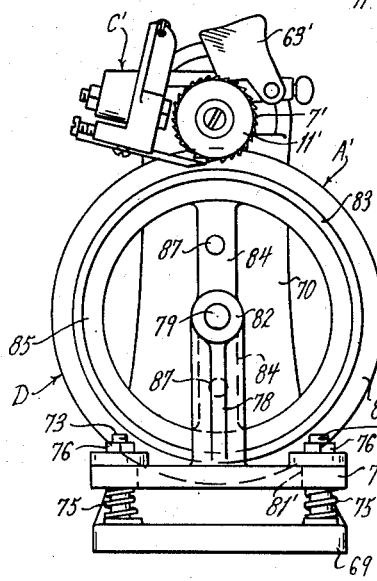
Figure 7:
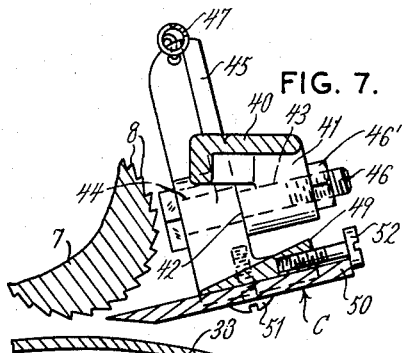
Figure 9:
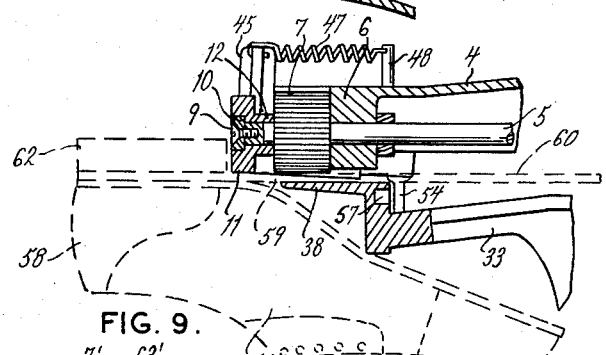
Figure 10:
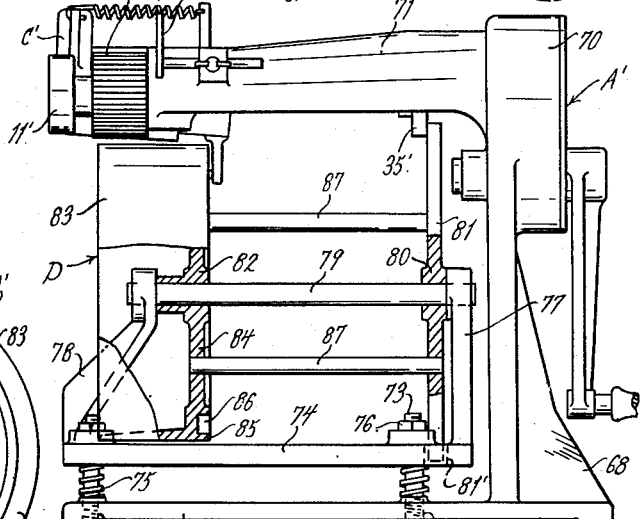

Figures 4 and 5 are transverse sectional views taken along lines 4—4 and 5—5 of Figure 1;

Figure 6 is a back view of the knife carrier;

Figure 7 is a transverse sectional view taken along line 7—7 of Figure 6;

Figure 8 is a transverse sectional view taken along line 8—8 of Figure 4;

Figure 9 is a fragmentary longitudinal sectional view showing work in position for skiving action;

Figure 10 is a front view of a modified type shank skiving machine constructed in accordance with and embodying the present invention; and Figure 11 is an end view of the modified type shank skiving machine.

Referring now by reference characters to the drawings which illustrate practical embodiments of the present invention, A designates a shank skiving machine having a frame 1 which may be integrally cast and which comprises a base plate 2, an upright member 3 at one side of the base plate 2, and a longitudinally extending, downwardly opening arcuate top portion 4. Disposed within the top portion 4 is a shaft 5 journaled at one of its ends in, and projecting through, a bearing 6 integrally formed at the free end of the top portion 4. Suitably mounted, as by keying, upon the projecting portion of the shaft 5, immediately adjacent the free end face of the top portion 4, is a feed roll 7 having its peripheral surface serrated, as at 8. The end extremity of the projecting portion of the shaft 5 is axially tapped for receiving a screw 9 which projects through an aligned aperture in a bush 10 for securing a guide or hold-down roll 11 upon the shaft 5. Said hold-down roll 11 is provided with a sleeve portion 12 for maintaining said roll 11 in outwardly spaced relation to the feed roll 7.

At its other end, the shaft 5 is journaled in, and projects through, a bearing 13 formed in the upper portion of the upright member 3, the projecting portion of the shaft 5 extending into an enlarged recess 14, integrally provided within the upright member 3 and mounted thereon is a pinion 15. Drivingly meshing with the pinion 15 and disposed in lowered relation thereto is a gear 16 secured upon a shaft 17, one of the ends of which is journaled in a bearing 18 provided in the upright member 3. Mounted on the other end of the shaft 17 is a crank handle 19, manual operation of which will cause the shaft 5 to be rotated through the gear 16 and pinion 15.

Tapped in the base plate 2 are, preferably, three equidistant apertures 20 for receiving upwardly extending bolts 21, which are provided with smooth shank portions, as at 22, the upper ends being threaded and projecting through aligned bores in bosses 23 formed in the base section 24 of a work support frame B. Said base section 24 is maintained in upwardly spaced relation to the base plate 2 by compression springs 25 encirclingly disposed about the shanks 22 of each bolt 21 and bearing at their ends against the under face of the base section 24 and the upper face of the base plate 2, said springs 25 thus biasing the work support frame B upwardly. Nuts 26 are engaged upon the threaded projecting ends of the bolts 21 for adjustably limiting the upward thrust of the work support frame B by the springs 25.

Centrally, the base section 24 is of increased thickness and provided with an enlarged rectangular aperture 27 the opposed transverse walls 28 of which are provided with aligned bearings 29 for journaling the ends of a pivot shaft 30. Rigidly secured upon the pivot shaft 30 is a sleeve 31 integrally formed on the lower end of a normally vertically extending arm 32, at the upper end of which is provided a longitudinally extending arm 33 in normally downwardly spaced relation to the shaft 5. At its inner end (reference being made to the right hand side of Figure 1) the arm 33 is secured, as by welding, to a narrow arcuate support bar 34, inwardly of the rear end thereof. The forward portion of said bar 34 projects substantially forwardly, terminating spacedly from approximately the vertical midpoint of the machine A. The upper portion of the outwardly presented face of the support bar 34 is adapted for sliding surface engagement against the planar face of a collar 35 suitably secured, as by a set screw, upon the shaft 5 whereby the work support frame B is prevented from unauthorized outward tipping. Suitably disposed within the upper face of the rearward end of the support bar 34 is the base of an upwardly projecting detent pin 36 for stop-wise abutment against the top portion 4 of the frame 1 to limit forward rocking of the work support frame B. The arm 33 in its outward portion inclines downwardly and at its outer end is supportingly secured to a flange 37 depending from the rearward margin of a transversely curved or segmentally shaped work support plate 38, disposed beneath the free end of the top portion 4 and the feed roll 7, with its forward margin terminating just inwardly of the outer edge of the feed roll 7. The work support plate 38 is relatively wide with its upwardly presented face being smooth-surfaced and the arc of curvature thereof being on the same radius as the support bar 34. At its rearward end, the work support plate 38 extends a short distance beyond the rearward end of the support bar 34, the forward ends thereof being aligned (see Figure 2). Providing additional rigidity to the work support frame B is a rod 39 extending longitudinally between, and having its ends secured in, the work support plate 38 and the support bar 34, adjacent their forward ends.

Integrally cast with the frame 1 and projecting rearwardly from the top portion 4, adjacent its free end, is a relatively small plate-like extension 40 having at its outer end a depending lug 41 in rearwardly spaced relation to the end portion of the shaft 5, outwardly of the feed roll 7. The lug 41 is provided with a downwardly and rearwardly inclined front face 42 and is drilled to provide a transversely extending bore 43, the axis of which is downwardly and forwardly inclined. Eccentrically aligned with the bore 43 is a diametrally increased bore 44 provided in an upwardly disposed arm 45 of a skiving knife carrier C for receiving a rearwardly directed eccentric pivot screw 46 by which the knife carrier C is mounted upon the lug 41, said screw 46 being secured by a nut 46' engaged on its projecting rearward end. The inclination of the front face of the lug 41 causes the carrier C to be presented at a like angle to the vertical, as may be seen in Figure 2. The upper end of the arm 45 is apertured to receive one end of a longitudinally extending spring 47, the opposite end of which is secured in a suitable aperture in the upper end of a post 48, the lower end of which is rigidly secured in the extension 40. It will thus be seen that the spring 47 causes the carrier C to be biased toward the so-called inner end of the machine A with a consequent normal tilting in that direction. At its lower end the arm 45 is integral with an inwardly extending knife holder 49, the under face of which is recessed for snugly receiving a knife 50 which is maintained in position by the heads of screws 51, suitably received in the base portion of the knife holder 49 adjacent the lateral margins of the knife 50. In its rearwardly presented face the holder 49 is tapped for receiving an adjustment screw 52, having a relatively enlarged head to engage the rear margin of the knife 50 for maintaining same in selected position. Thus, by loosening of the screws 51, 52, the knife 50 may be moved rearwardly or forwardly within the holder 49 into desired position and may be maintained therein by tightening of said screws 51, 52. Furthermore, the generally enlarged size of the head of the screw 52 provides adequate support for resisting any rearward pressures developed upon the knife 50 during operation, thereby securing same against unauthorized displacement.

It is to be noted that due to the inclination of the carrier C, caused by the contour of the front face of the lug 41 the knife 50 will be presented at a complementary angle to the vertical. The forward sharpened margin of the knife 50 extends forwardly to a point just beneath, and in close adjacency to, the feed roll 7, slightly rearwardly of the vertical axis thereof, above the upper face of the work support plate 38. Said knife 50, on its outer margin, projects beyond the forward edge of the work support plate 38 in substantial alignment with the hold-down roll 11 and with its inner margin terminating outwardly of the inner margin of the work support plate 38 (see Figure 1). The normally inward tilting of the carrier C, effected by the urging of the spring 47, will correspondingly cause the knife 50 to be presented at an angle to the horizontal which is approximately 13° whereby the outward edge of the knife 50 will be elevated in relation to the inner edge, as may best be seen in Figure 6, so that said inner edge will be in immediate adjacency proximate to the upper face of the work support plate 38.

Secured to the rearward face of the knife holder 49 in its inner portion, by an eccentric screw 53, is the upper end of an arm 54, which projects downwardly, inwardly of the flange 37 provided on the work support plate 38. Suitably mounted upon a lug 55, projecting forwardly from the bottom portion of the arm 54, is a roller member 56 which is disposed within an inwardly opening race 57 formed in the flange 37 and extending from substantially end to end thereof. By the co-action between the roller 56 and the race 57 in the flange 37, the carrier C and the support plate 38 are maintained in mechanical relationship whereby upward and downward movement of the work support frame B will effect a corresponding rocking movement of the carrier C about the pivot pin 46 for purposes more fully appearing hereinafter.

In operation, a worn shoe, such as illustrated by numeral 58 in Figure 9, having a sole shank portion 59 and an already loosened sole portion 60 is disposed longitudinally upon the work support plate 38 so that the worn face of the sole 60 is presented upwardly and the shoe body 61 is disposed downwardly beneath the support plate 38 with the heel section 62 outwardly of the outer end of the machine A. The rearward margin of the sole 60 is disposed against the feed roll 7 so that upon actuation of the shaft 5, by means of the crank arm 19 with consequent rotation of the feed roll 7, the sole 60 will be gripped thereby and, hence, pulled rearwardly causing the work support plate 38 to be pivoted rearwardly about the pivot shaft 30 for feeding the work to the knife 50. In the course of the work feeding movement, the hold-down roll 11 will engage upon the portion of the sole shank 59 immediately adjacent the heel 62 to exert a downward pressure thereon for counteracting any tendency for the heel portion 62 to spring upwardly during the skiving action with potential inexpedient displacement of the sole 60. As the work is advanced, the knife 50 will cut a uniform bevel in the shank portion 59 while severing the sole 60, which will ride over the upper inclined face of the knife holder 49 and be easily removed from the machine A. The transverse curvature of the work support plate 38 flush-wise accommodates the field of severance of the sole 60 regardless of the arcuate character thereof so that the knife 50 will cut a bevel which is of uniform degree throughout. The curvature of the work support plate 38 thus causes the work to be fed in a downward arc to the knife 50 and not along a horizontal planar surface as in currently used skiving machines. If the curvature of the shank 59 presents a height in excess of the normal distance between the work support plate 38 and the feed roll 7, the work support plate 38 will yield downwardly against the bias of the springs 25 in order that the shank 59 may be suitably accommodated for the skiving action. This depression of the work support plate 38 will, through pressure of the upper wall of the race 57 upon the roller 56, cause the arm 54 to be pulled downwardly thereby pivoting the carrier C about the eccentric screw 46 whereby the angle of the knife 50 with relation to the horizontal will be increased commensurately in order to cut an appropriate bevel in the increased height portion of the shank 59. As the lesser curved portions of the shank 59 are fed toward the knife 50, the work support plate 38 will, through urging of the springs 25, shift upwardly correspondingly and the knife 50 will be returned to normal positionment through upward lifting of the carrier C by pressure of the bottom face of the race 57 upon the roller 56 and through bias of the spring 47. The rocking movement of the carrier C, consequent to the upward and downward movement of the work support plate 38, is effectively controlled by the eccentricity of the screws 46 and 53, so that the desired degree of angularity will be provided the knife 50. Therefore, it is evident that the knife 50 is positioned responsive to the movement of the work support plate 38 whereby a bevel or so-called "scarf" of constant degree is assured, irrespective of the transverse contour of the shank 59.

At the completion of the skiving action, the work support frame B will automatically return to its initial position by pivoting about the pivot shaft 30 through gravity with the detent pin 36, properly limiting such motion.

It is, of course, apparent that the machine A may be easily utilized for skiving the leather from which the new soles are formed. In order to appropriately limit the extension of such leather stock into the machine A, a gage 63, having an enlarged outwardly presented face 64, is disposed adjacent the forwardly presented face of the free end of the top portion 4, by means of an integrally formed stem 65, which projects through a bore in a boss 66 extending forwardly from the top portion 4. Engaged in the boss 66 is a set screw 67 for engaging the stem 65 to maintain the gage 63 in selected longitudinal, and upward or downward, position, the upward disposition thereof being necessary during the shank skiving operation. With the downward yielding of the support plate 38, it is evident that varying thicknesses of leather can be readily accommodated in the machine A with corresponding positive disposition of the knife 50 to cut a uniform bevel therealong.

If desired, a modified type shank skiving machine A' may be provided having a main frame 68 with an enlarged base plate 69, an upright 70, and top portion 71, said upright 70 and top portion 71 being substantially identical to the upright 3 and top portion 4 of the frame 1 hereinabove described. Further provided on the modified type machine A' is a skiving knife carrier C', feed roll 7', hold-down roll 11', gage 63', substantially identical to the corresponding parts hereinabove described in connection with the machine A. Tapped in the base plate 69 is a plurality of apertures 72 for receiving upwardly extending smooth shank bolts 73, the upper ends of which project through suitable aligned apertures in a generally rectangularly shaped base section 74 of a work support assembly D. Said base section 74 is maintained in upward spaced relation to the base plate 69 by compression springs 75, encirclingly disposed about the shanks of the bolts 73 and bearing at their ends against the upper face of the base plate 69 and the under face of the base section 74. Engaged upon the upper projecting ends of the bolts 73 are retention nuts 76. Integrally cast with the base section 74 and projecting upwardly from its opposed inner and outer ends are arms 77, 78, respectively, having bearings formed in their upper ends for journaling the ends of a longitudinally disposed shaft 79 extending therebetween. Fixed upon the shaft 79, adjacent its inner end, is the hub 80 of a wheel-like support member 81, the lower portion of which extends into a suitable arcuate recess 81' formed in the base section 74. Said member 81 engages upon its outer face adjacent its periphery a collar 35', similar to the collar 35, described in connection with the machine A, to prevent untoward outward tilting of the assembly D. Fixed upon the forward end of the shaft 79 is the hub 82 of a balanced annular work support plate 83, being connected to the hub 82 by a plurality of radially extending spoke-like bars 84. Said annular work support 83 is disposed beneath the feed roll 7' and is provided on its inner margin with a circumferentially extending radial flange 85 having formed therein an inwardly opening annular race 86 for receiving the roller (not shown) of the carrier C'. Providing an over-all rigidity to the assembly D is a plurality of longitudinally disposed rods 87 fixed at their ends in the support member 81 and in the spokes 84 of the work support plate 83. It will thus be seen that the work support plate 83 provides a continuous arcuate surface for the work during skiving action. The assembly D is adapted for upward and downward shifting movement responsive to the thickness of the sole or leather stock being skived with the carrier C' being correspondingly adjusted by the roller (not shown) within the race 86. Furthermore, it is to be particularly observed that there is no necessity of presetting the work support plate 83 prior to positioning the work thereon since the portion of the plate 83 immediately adjacent to, and forwardly of, the feed roll 7' may be utilized, regardless of the amount of previous rotation thereof. Additionally, the continuous character of the work support plate 83 adapts same for readily accommodating soles for edge beveling operation.

It should be understood that changes and modifications in the form, construction, arrangement, and combination of the several parts of the shank skiving machine may be made and substituted for those herein shown and described without departing from the nature and principle of the present invention.

Having thus described my invention, what I claim and desire to secure by Letters Patent is:

1. A shank skiving machine comprising a main frame, a shaft mounted on said frame, a feed roll fixed on said shaft, an arcuate work support plate mounted on said main frame for vertical shiftable movement, said work support plate being adapted for movement about an axis parallel to the axis of said shaft, the upper face of said work support plate being disposed beneath said feed roll for co-operation therewith in feeding work for skiving action, a skiving knife carrier mounted on said main frame for pivotal movement, a knife supported by said carrier having its cutting edge confronting the space between the feed roll and the work support plate, the plane of said knife being substantially normal to said knife carrier spring means biasing said carrier in pivoted position whereby the plane of the knife will be presented at an angle to the horizontal with the inner portion of the cutting edge of said knife in lowered relation to the outer portion thereof, an arm depending from said carrier inwardly of the work support plate, and means associated with said arm for engagement with the work support plate whereby upon vertical movement of the work support plate the carrier will be rocked for altering the angle of the knife to the horizontal commensurate with the vertical movement of the work support plate.

2. A shank skiving machine comprising a main frame, a shaft mounted on said frame, a feed roll fixed on said shaft, a work support frame resiliently mounted on said main frame for vertical shiftable movement, a curved work support plate provided on said work support frame and being disposed beneath said feed roll, said work support plate being adapted for swingable movement about an axis parallel to the axis of said shaft for co-operation with the feed roll for feeding work for skiving action, said work support plate being provided on one margin with a radial flange having a race formed therein, a skiving knife carrier mounted on said main frame for pivotal movement, a knife supported by said carrier having its cutting edge confronting the space between the feed roll and the work support plate, an arm depending from said carrier, and a roller provided upon the lower portion of said arm for disposition within the race of the flange of the work support plate for relative movement therein whereby upon vertical movement of the work support frame the carrier will be rocked for altering the angle of the knife to the horizontal commensurate with the vertical movement of the work support plate.

3. A shank skiving machine comprising a main frame, a shaft mounted on said frame, a feed roll fixed on said shaft, a collar member mounted on said shaft inwardly of the feed roll, a work support frame resiliently mounted upon said main frame and having an outwardly extending arm, a curved support bar provided on said work support frame for surface engagement with the planar face of said collar to prevent unauthorized outward tilting of the work support frame, and a curved work support plate having a radius of curvature substantially the same as that of the support bar and being mounted on the outer end of said arm in spaced relation beneath said feed roll.

4. A shank skiving machine comprising a main frame, a shaft mounted on said frame, a feed roll fixed on said shaft, a work support frame mounted on said main frame for vertical shiftable movement, a curved work support plate carried on said work support frame and adapted for movement about an axis parallel to the axis of said shaft for co-operation with said feed roll in work feeding operation, a mounting lug provided on said main frame upwardly of said work support plate and having a vertically inclined face, a skiving knife carrier pivotally mounted adjacent its outer end on the inclined face of said lug in upward relation to said work support plate and being presented at a like angle to the vertical as the face of said lug, an arm connected to, and depending from, adjacent the inner end of said skiving knife carrier for extension beyond the upper surface of the work support plate, a roller carried by said arm and adapted to rotate about an axis parallel to the axis of said shaft, said work support plate having a raceway within which said roller is engaged whereby said skiving knife carrier will be pivoted upon vertical movement of said work support frame, and a skiving knife carried by said skiving knife carrier.

5. A shank skiving machine comprising a main frame, a shaft mounted on said frame, a feed roll fixed on said shaft, a skiving knife carrier mounted on said main frame for pivotal movement, a knife supported by said carrier and having its cutting edge disposed beneath said feed roll, a work support frame comprising a base mounted on said main frame beneath said shaft and resiliently urged upwardly toward said shaft, a normally vertical arm pivotally mounted at one end on said base for swinging movement about an axis parallel with said shaft, a longitudinally extending arm connected to the other end of said vertical arm for movement therewith, an arcuate work support plate carried by said longitudinally extending arm for movement with said arms, said support plate being presented beneath the cutting edge of said knife for cooperation with the feed roll in feeding work to the knife, said support plate projecting beyond on one side of said vertical arm a greater distance than beyond the other side thereof for biasing said work support plate through gravity into an initial or starting position, and means on said skiving knife carrier for engaging said work support plate whereby upon vertical movement of said plate the carrier will be pivoted for altering the angle of the knife to the horizontal commensurate with the vertical travel of the work support plate, said means permitting relative movement between said skiving knife carrier and said work support plate during work feeding operation.

6. A shank skiving machine comprising a main frame, a shaft mounted on said frame, a feed roll fixed on said shaft, a work support frame mounted on said main frame for vertical shiftable movement, a curved work support plate carried on said work support frame and adapted for movement about an axis parallel to the axis of said shaft for cooperation with said feed roll in work feeding operation, a mounting lug provided on said main frame upwardly of said work support plate and having a vertically inclined face, a skiving knife carrier pivotally mounted adjacent its outer end on the inclined face of said lug in upward relation to said work support plate and being presented at a like angle to the vertical as the face of said lug, resilient means engaged to the carrier in its outer end portion for urging same inwardly so the inner end of said carrier will be normally presented in lowered relation to the outer end thereof, an arm connected to, and depending from, adjacent the inner end of said skiving knife carrier, for disposition inwardly of the inner margin of said work support plate, a roller mounted on said arm below the knife carrier and spaced therefrom for rotation about an axis normal to the longitudinal axis of said arm, said work support plate having a raceway on its inwardly presented face for engagement therein of the roller whereby said roller will relatively move therein upon movement of said work support plate about its axis of movement and said knife carrier will be pivoted upon vertical movement of said work support frame for automatic altering of its horizontal angle commensurate with the amount of vertical travel of said work support frame, and a skiving knife adjustably mounted on said carrier.

7. A shank skiving machine comprising a main frame, a shaft mounted on said frame, a feed roll fixed on said shaft, a work support frame resilienty mounted on said main frame for vertical shiftable movement, a work support member provided on said work support frame, said work support member having a curved work-receiving portion disposed beneath said roll and adapted for movement about an axis parallel to the axis of said shaft for cooperation with the feed roll for feeding work for skiving action, said curved work-receiving portion of the work support member being provided on one margin with a radial flange having a race formed therein, a skiving knife carrier mounted on said main frame for pivotal movement, a knife supported by said carrier having its cutting edge confronting the space between the feed roll and the work support member, an arm depending from said carrier inwardly of the work support member, and a roller provided upon the lower portion of said arm for disposition within the race of the flange of the work support member for relative movement therein whereby upon vertical movement of the work support frame the carrier will be rocked for altering the angle of the knife to the horizontal commensurate with the vertical movement of the work support member.

8. A shank skiving machine as described in claim 7 wherein a shaft is journalled on said work support frame in parallel relation to said main frame shaft, and said work support member is mounted on said work support frame shaft for rotation therewith.

9. A shank skiving machine as described in claim 8 wherein the work support member is annular whereby at all times the portion beneath the feed roll will be curved.

References Cited in the file of this patent

UNITED STATES PATENTS

| | | |
|---|---|---|
| 920,456 | Grover | May 4, 1909 |
| 1,010,065 | Medalie | Nov. 28, 1911 |
| 1,964,829 | Peterson et al. | July 3, 1934 |
| 2,461,462 | Zahn | Feb. 8, 1949 |

FOREIGN PATENTS

| | | |
|---|---|---|
| 181,603 | Germany | Mar. 2, 1907 |
| 592,317 | Great Britain | Sept. 15, 1947 |